United States Patent
Hayman et al.

(10) Patent No.: US 10,473,521 B2
(45) Date of Patent: Nov. 12, 2019

(54) ANALOG PHOTON COUNTING

(71) Applicant: University Corporation for Atmospheric Research, Boulder, CO (US)

(72) Inventors: Matthew Hayman, Boulder, CO (US); Scott Spuler, Westminster, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 219 days.

(21) Appl. No.: 15/479,445

(22) Filed: Apr. 5, 2017

(65) Prior Publication Data

US 2018/0292257 A1   Oct. 11, 2018

(51) Int. Cl.
*G01J 1/44*   (2006.01)

(52) U.S. Cl.
CPC ........... *G01J 1/44* (2013.01); *G01J 2001/442* (2013.01); *G01J 2001/446* (2013.01)

(58) Field of Classification Search
CPC ... G01J 1/44; G01J 2001/446; G01J 2001/442
USPC ...................................................... 250/207
See application file for complete search history.

(56) References Cited

U.S. PATENT DOCUMENTS

| | | | | |
|---|---|---|---|---|
| 5,321,261 A * | 6/1994 | Valenta | ..................... | G01J 1/08 250/252.1 |
| 6,737,642 B2 | 5/2004 | Syage et al. | | |
| 7,139,367 B1 | 11/2006 | Le | | |
| 7,157,681 B1 * | 1/2007 | Tetzlaff | ................... | H01J 43/04 250/205 |
| 8,653,435 B2 * | 2/2014 | Eldesouki | ................ | G01J 1/46 250/208.1 |
| 8,766,161 B2 * | 7/2014 | Kanter | ..................... | G01J 1/44 250/208.2 |
| 9,897,707 B2 * | 2/2018 | Durst | ..................... | G01T 1/208 |
| 2005/0024249 A1 | 2/2005 | Pavicic | | |
| 2015/0028213 A1 | 1/2015 | Weinberg et al. | | |

* cited by examiner

*Primary Examiner* — Seung C Sohn
(74) *Attorney, Agent, or Firm* — The Ollila Law Group LLC

(57) ABSTRACT

A photon counting system is provided. The photon counting system comprises an analog domain and a digital domain in communication with the analog domain. A detector is configured to detect photons. An analog digital converter is provided in the digital domain, while an amplifier circuit is provided in the analog domain that is configured to receive the detector's output, wherein the amplifier circuit's output is in communication with the analog digital converter. The output of the analog digital converter is in communication with a signal processing system that may perform accumulation of signals and store them in memory.

18 Claims, 5 Drawing Sheets

ANALOG PHOTON COUNTING

FIELD OF THE INVENTION

The embodiments described below relate to photon sensing, and more particularly to a hybrid photon counting and analog digitization LIDAR method and related apparatus.

BACKGROUND

Lidar comprises techniques and apparatuses that combine laser-focused imaging with radar in order to calculate distances by measuring the return time for a signal sent from a sensor. In implementing a lidar system, often, the question of whether to utilize photon counting versus analog digitization arises.

Analog digitization has high linearity up to the limits of the analog to digital converter (ADC) used, but has limited dynamic range due to ADC bit resolution. Analog digitization tends to perform well in hard target situations where a full backscatter waveform is desirable, but lacks the low light sensitivity needed for most atmospheric lidar where the dynamic range of signals span several orders of magnitude.

Photon counting, on the other hand, is exceptionally versatile, as it is highly sensitive to low light levels. Given infinite time, photon counting theoretically has infinite sensitivity. However, photon counting exhibits two principle problems. First, due to time resolution requirements and atmospheric variability, a system does not have infinite time. Second, the method suffers from substantial nonlinearity in regions of high signal. Two sources contribute to this nonlinearity. For avalanche photodiodes (APDs) operating in geiger mode, the detector must "reset" after each output pulse, so the detector exhibits a fundamental dead time. For photomultiplier tubes (PMTs) and hybrid PMTAPDs (called Hybrid Photo Detectors or HPDs), nonlinearity is caused by the counting method, as multiple photons arrive within a fixed period, but only one photon can be detected at a time. In essence, coincident photons are missed either because the detector cannot quench its pulse release mechanism fast enough (e.g. in APDs) or the counter cannot register pulses that are have piled up (e.g. in PMTs and HPDs). While correction of this nonlinearity has been attempted, in practice the correction rarely works well at all photon count rates.

One problem with obtaining a linear atmospheric profile from photon counting is the substantial difference in dynamic range one can expect from low and high altitude profiles. Obtaining linear observations at low altitudes requires attenuation, which inherently works against obtaining statistically significant profiles at higher altitudes. This means that higher altitudes will require particularly long integration times. Some workarounds for this are through the use of high repetition rate and low pulse energy (commonly referred to as "micropulse") lasers, where signal shots are unlikely to produce nonlinear response and they can be integrated on rapid temporal scales. The problem, however, is that pulse energy can be so low it cannot overcome background noise limits, while higher repetition rates limit the maximum resolvable range of the lidar.

In an effort to address single photon counting nonlinearity, detector hybrids that output both a digitized analog signal and a photon counting signal have been developed, but the user has to combine or "stitch" together the two signals. This is problematic because one needs an overlap area where the ADC has sufficient resolution to accurately represent the signal (which is best suited to large signals) and the photon counting system is linear (which is best suited to small signals). The area of overlap where the photon counting system is linear and the analog system is low noise tends to be small if even present at all.

The embodiments described below overcome these and other problems and an advance in the art is achieved. The embodiments described below provide a hybrid technique between photon counting and analog digitization that offers the high-end dynamic range of an analog digitizer combined with the low-end dynamic range of a photon counting system. The method and apparatus utilize a fully integrated approach, thus avoiding problematic signal stitching. The embodiments essentially digitize PMT (or HPD) pulse waveforms instead of analog backscatter waveforms. The pulses are integrated so their energy is captured rather than relying on a binary pulse count. Therefore, the embodiments do not require the signal to fall below a pulse count threshold before additional signals are registered, so pulse pileup issues are avoided.

SUMMARY OF THE INVENTION

A photon counting system is provided that comprises an analog domain and a digital domain in communication with the analog domain. A detector is configured to detect photons and an analog digital converter in is the digital domain. An amplifier circuit in the analog domain is configured to receive the detector's output, wherein the amplifier circuit's output is in communication with the analog digital converter.

A method for counting photons is provided. The method comprises providing a system having an analog domain, a digital domain in communication with the analog domain, and a detector configured to detect photons. Photons are detected with the detector. A signal of the detector is integrated in the analog domain, and the integrated signal is digitized with an analog digital converter in the digital domain. A digital signal of the analog digital converter is differentiated.

ASPECTS

According to an aspect, a photon counting system comprises an analog domain, a digital domain in communication with the analog domain, a detector configured to detect photons, an analog digital converter in the digital domain, and an amplifier circuit in the analog domain configured to receive the detector's output, wherein the amplifier circuit's output is in communication with the analog digital converter.

Preferably, the detector comprises an analog detector.

Preferably, the detector comprises at least one of a photo multiplier tube and a hybrid photo-diode.

Preferably, the amplifier circuit comprises a pre-amplifier and a low-pass filter.

Preferably, the low-pass filter is configured to provide an integrated pulse profile to the analog digital converter.

Preferably, the system further comprises an accumulator in communication with the analog digital converter, wherein the accumulator is configured to integrate a signal from the analog digital converter over a predetermined number of signals.

Preferably, an accumulator value is stored in a memory.

Preferably, the predetermined number of signals corresponds to a range bin.

Preferably, the accumulator is reset to zero after the accumulator value is stored in the memory.

Preferably, the accumulator is configured to integrate the signal from the analog digital converter over the predetermined number of signals before the accumulator value is reset to zero.

Preferably, a filter is provided between the analog digital converter and the accumulator.

According to an aspect, a method for counting photons comprises: providing a system having an analog domain, a digital domain in communication with the analog domain, and a detector configured to detect photons; detecting photons with the detector; integrating a signal of the detector in the analog domain; digitizing the integrated signal with an analog digital converter in the digital domain; and differentiating a digital signal of the analog digital converter.

Preferably, the signal is sampled at a predetermined resolution, and wherein a difference between two sample points corresponds to the amount of signal in an associated time bin.

Preferably, the signal is a current.

Preferably, the step of integrating a digital signal of the analog digital converter comprises integrating the digital signal with an accumulator.

Preferably, the detector comprises an analog detector.

Preferably, the detector comprises at least one of a photo multiplier tube and a hybrid photo-diode.

Preferably, the detector signal comprises integrated pulses corresponding to pulse energy.

Preferably, the step of detecting photons with the detector comprises capturing a plurality of photons with the detector, and the step of integrating a signal of the detector in the analog domain comprises integrating a combined energy of the plurality of photons.

Preferably, the method comprises detecting additional photons with the detector before the signal falls below a predetermined threshold.

BRIEF DESCRIPTION OF THE DRAWINGS

The same reference number represents the same element on all drawings. The drawings are not necessarily to scale.

DETAILED DESCRIPTION OF THE INVENTION

FIGS. 1-9 and the following description depict specific examples to teach those skilled in the art how to make and use the best mode of embodiments of an analog photon counting system and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In present embodiments, an ADC is scaled to resolve individual PMT pulse energy, and to increment a range profile based on the energy in those pulses. In its simplest form, this is accomplished by measuring an integrated current from the PMT. That integrated current may be sampled at the desired time (or corresponding lidar range) resolution where the difference between two sample points corresponds to the amount of signal in the associated time (range) bin. This principle works irrespective of the PMT output (e.g. analog or Geiger). It also relaxes requirements on fast pulse PMTs which are commonly desired to avoid pulse pileup. The transition between photon counting and analog mode thus becomes seamless because it is an analog integration process.

Figure 1:
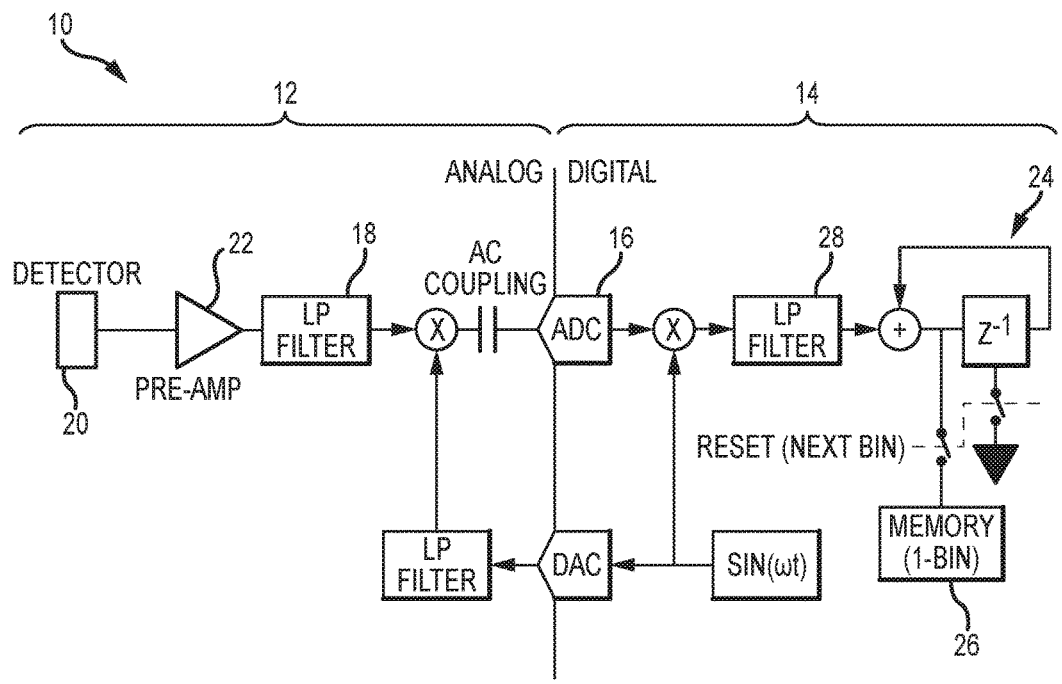
FIG. 1 illustrates a diagram of a photon counting system according to an embodiment.

Turning to FIG. 1, a block diagram illustrates an embodiment for a system 10 according to an embodiment. It should be noted that other schemes/circuits are contemplated that will inevitably have various practical tradeoffs, which will be recognized by those skilled in the art. In FIG. 1, the integration process described above is split between analog 12 and digital 14 domains. Imparting more integration on the analog domain 12 relaxes digital sample rate requirements, eventually approaching the desired time (range) gate resolution of the lidar. However, the ADC 16 then needs to be able to resolve the entire integrated profile which limits its ability to also resolve individual pulses. The use of a low-pass filter 18 in front of the ADC 16 allows the ADC 16 to sample at reasonable rates but also accurately resolve the detector 20 (e.g. PMT) pulses. Furthermore, most high sample rate ADC boards have AC-coupled inputs that block low frequency components. This is undesirable for the technique presented here, so an AC modulation scheme is also implemented to pass information to the ADC 16 without attenuation of important low frequency components exiting the detector 20. In principle the AC modulation scheme presented here is not needed to implement this technique as long as the ADC input is designed to accept frequencies down to DC. The detector 20 outputs to a preamp 22 and low-pass filter 18 which may be integrated into a single amplifier circuit (thereby reducing issues with gain bandwidth product in the preamp 22). The low-pass filter 18 broadens the detector 20 photon pulses, but because pulse pileup is a nonissue, this does not degrade the system's 10 dynamic range. The bandwidth on the input side only becomes an issue when it is below the backscatter signal bandwidth (as would be dictated by the bin width). In an embodiment, the low-pass filter 18 used has a 10 MHz cutoff frequency. This is merely an example, and low-pass filters 18 having higher or lower cutoff frequencies are also contemplated. In addition it is contemplated that the detector 20 may be not only a PMT, but any other photon detector known in the art.

The low-pass filtered signal is then input to the ADC 16, which samples the input at high rate. One factor considered relates to the ability to accurately integrate incoming pulses and then make sharp transitions between bin edges. Therefore some of the bin integration may take place in the digital domain 14. In some instances, accurate digital integrals require sample rates that are above the signal bandwidth. The benefit of the digital integration is that the ADC 16 may comprise a lower maximum voltage relative to the pulse height, which relates to better voltage resolution on the pulse.

The digitized signal from the ADC then passes to an accumulator 24 (e.g. discrete integrator). The integration may be performed over a set number of samples corresponding to one range bin. When that integral bin count is reached, the value in the accumulator 24 is stored in memory 26 corresponding the particular range bin and the accumulator value is reset to zero. The accumulator 24 then begins integration for the next range bin. Accumulation may also be performed by storing the accumulated output after each sample is acquired. That signal may be differentiated at a lower resolution to produce a range resolved profile. Once a binned profile is accumulated, multiple shots can be integrated in the same way as a conventionally acquired signal through photon counting or digitization. A second low-pass filter 28 may be included proximate the accumulator, as illustrated. It will be clear to one skilled in the art that variations on this circuit are contemplated. For example, without limitation, a high-pass filter may be substituted for a low-pass filter.

According to an embodiment, a Monte-Carlo model is provided wherein the arrival times of pulses are generated by an exponential distribution. This is intended to roughly simulate a lidar profile, where the signal decays with range. The use of an exponential distribution lacks the $1/R^2$ (where R=range) term typical to an atmospheric lidar signal, but still allows evaluation the system in the presence of a truly dynamic signal. In an example, the exponential probability density function (ePDF) follows:

$$p(t) = \frac{1}{\beta}\exp\left(-\frac{t}{\beta}\right) \quad (1)$$

Where:
t is the pulse arrival time; and
β is the decay constant.

Mean photon arrival rate is then related to the number of pulses generated in the program. The arrival rate is given by:

$$<R_A(t)> = \frac{N}{\beta}\exp\left(-\frac{t}{\beta}\right) \quad (2)$$

Where:
$<R_A>$ is the mean photon arrival rate; and
N is the total number of samples generated from the ePDF.

These equations push the limits of the analog photon counting system 10 by providing about 500 samples per profile and a decay constant of about 667 μs. Gaussian noise may be added to the analog data prior to the ADC 16 input with a standard deviation of about 2% of the total pulse height.

Figure 2:
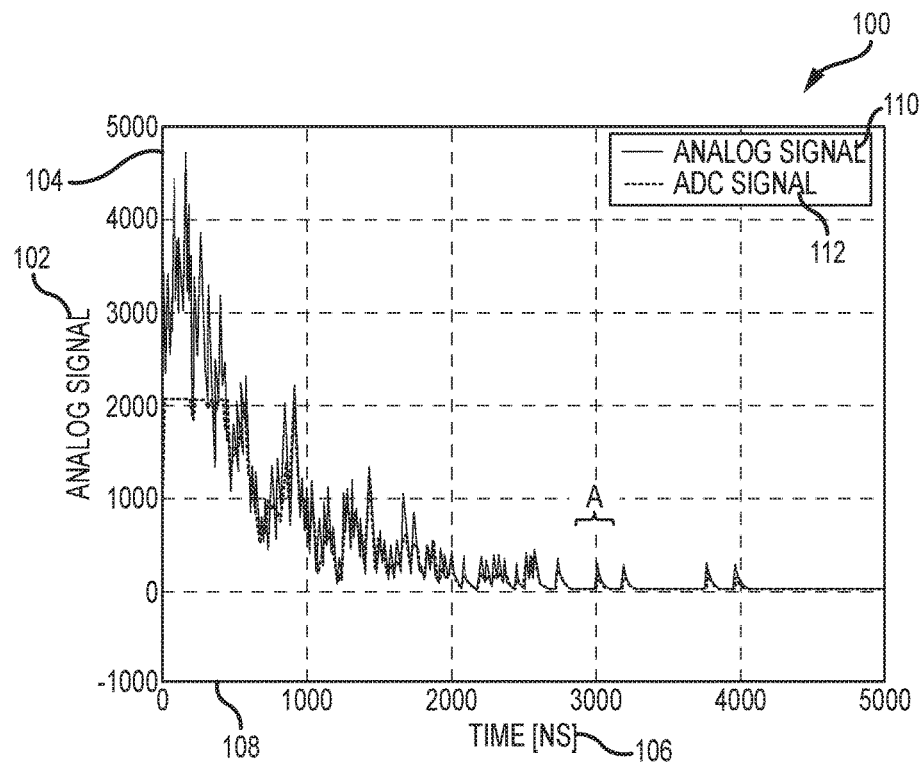
FIG. 2 illustrates a graph of detector output over time, according to an embodiment.

FIG. 2 illustrates an example of a graph 100 showing an analog signal 102 on the Y-axis 104 from a single shot, with time 106 being represented by the X-axis 108. The solid trace represents a high temporal resolution simulation 110 (above the ADC sample rate), and the dashed represents the ADC recorded signal 112. As can be seen, the ADC signal 112 saturates at the beginning of the exponential decay to demonstrate the dynamic range limits of the technique. In this configuration, approximately seven detector pulses, as an example, will fit in the dynamic range of the ADC without saturating. In this particular example, it should be noted that a modulation signal and a high-pass filter on the ADC 16 input are not modeled for clarity purposes, but may be provided in embodiments.

Figure 3:
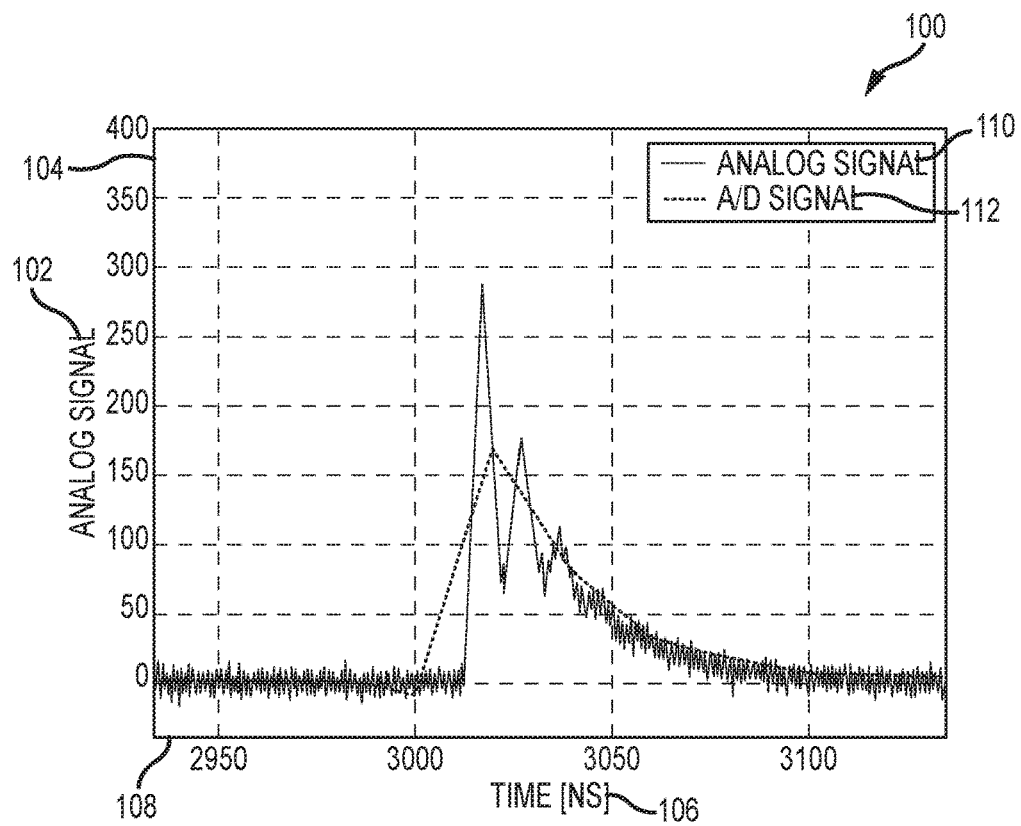
FIG. 3 illustrates a single pulse from the region noted "A" in FIG. 2.

Turning to FIG. 3, which is a magnified view of the graph 100 of FIG. 2, a single pulse from the region noted "A" in FIG. 2 shows the corresponding detector input signal 110 and the resulting ADC output 112. Note the simulated pulses are assumed to have ringing due to transmission line inductance and detector capacitance.

Figure 4:
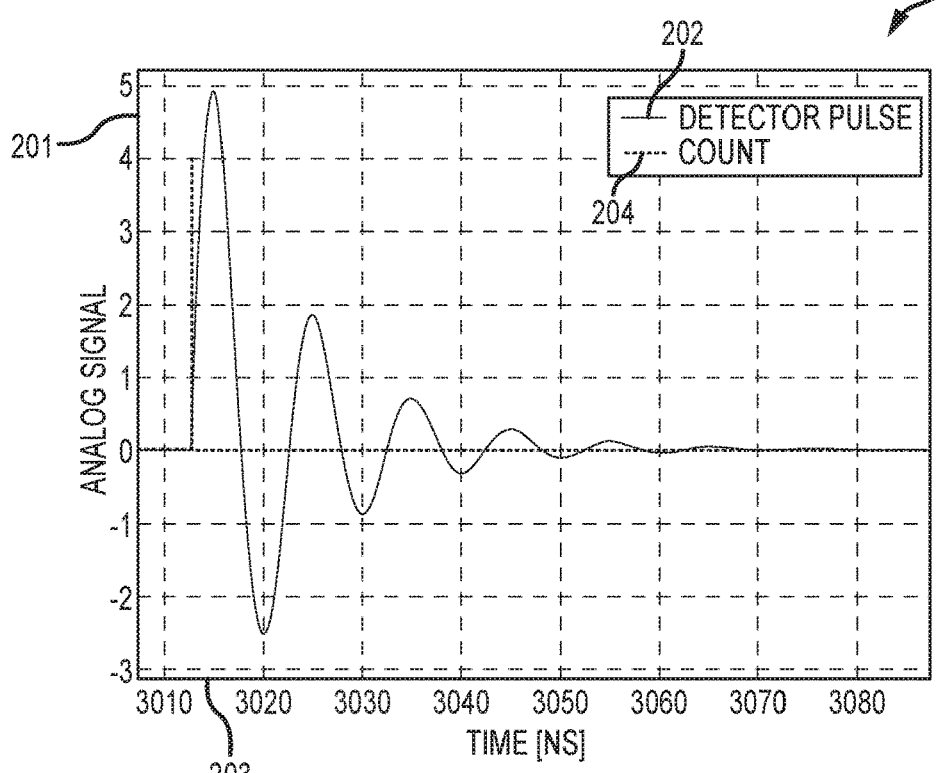
FIG. 4 illustrates a graph of pulse simulation according to an embodiment.
Figure 5:
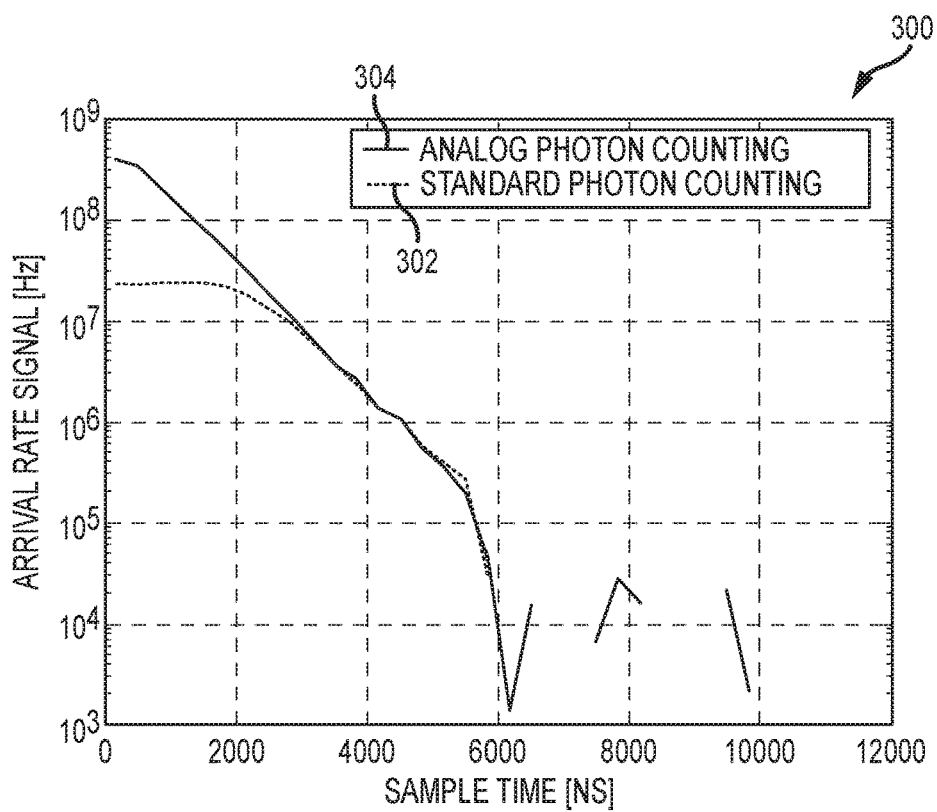
FIG. 5 illustrates a graph of backscatter signal according to an embodiment.

Turning to FIGS. 4 and 5, a standard prior art photon counting system is also simulated in addition to the techniques described related to the analog photon counting system 10 disclosed herein. The signal used for this is obtained prior to the low-pass filter 18 (FIG. 1) in order to provide maximum bandwidth (i.e. minimum pulse pileup effects) for the technique. An example of the pulse 202 used in the simulation is illustrated by the graph 200 of FIG. 4. The Y-axis 201 represents the analog signal, and the X-axis 203 represents time. The threshold for counting a pulse is 0.5 in this example, and the counting system is assumed to have a dead time of 35 ns. Note that the count flag 204 only triggers once on the pulse. FIG. 5 illustrates a graph 300 that simulates an example case where 100 profiles are integrated. The resulting profiles are then recorded for both standard photon counting 302 and the analog photon counting technique 304 provided as an embodiment. For this simulation, the bin widths are 667 ns (100 m). The high count rates at the initial part of the profile produce nonlinear behavior in both techniques. However, this saturation effect is only significant in the first bin of the analog photon counting technique 304, where the standard photon counting technique 302 suffers significantly in the first three bins and still has substantial error beyond that. Note also that the signal statistics due to shot noise are comparable between the two methods. Thus, the analog photon counting technique 304 extends the upper end of its dynamic range but without adversely impacting the bottom end.

Figure 6:
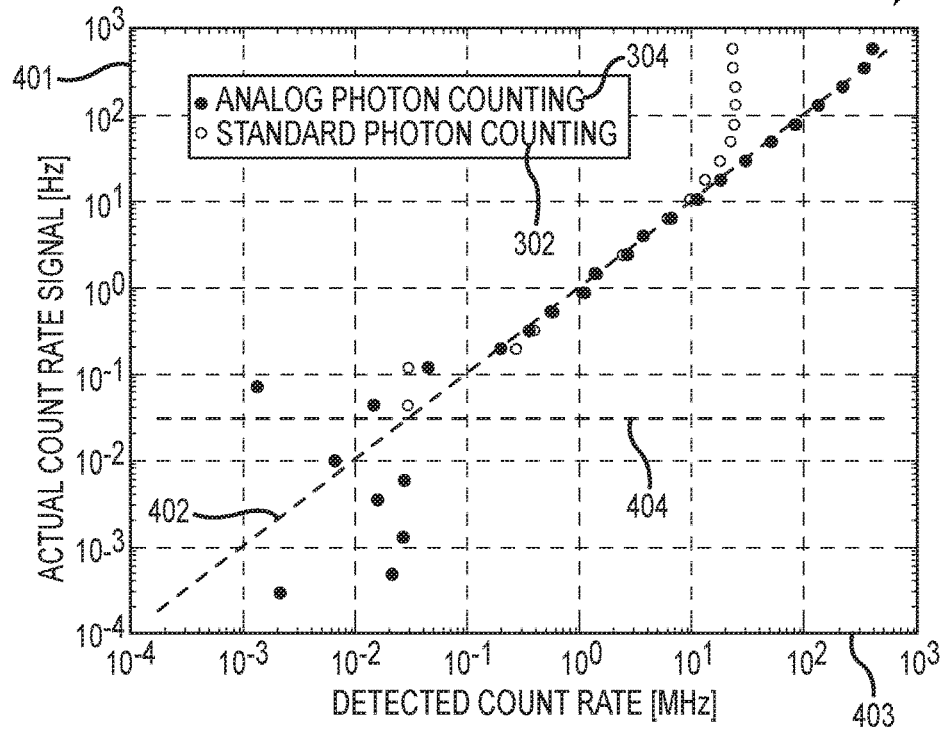
FIG. 6 illustrates a graph of photon arrival rate according to an embodiment.

FIG. 6 illustrates a graph 400 of the actual photon arrival rate versus the arrival rate calculated from standard photon counting 302 and analog photon counting 304, thus comparing the dynamic ranges of the two techniques. The Y-axis 401 represents an actual count rate, and the X-axis 403 represents the detected count rate. The diagonal dashed line 402 is the 1:1 line, and the horizontal dashed line 404 is the limit indicating where the average photon count per bin (for 100 laser shots) is less than 1. It will be appreciated that the standard photon counting technique 302 deviates significantly from the 1:1 line beyond 10 MHz, whereas the analog photon counting technique 304 tends to deviate in the mid-hundreds MHz range.

Figure 7:
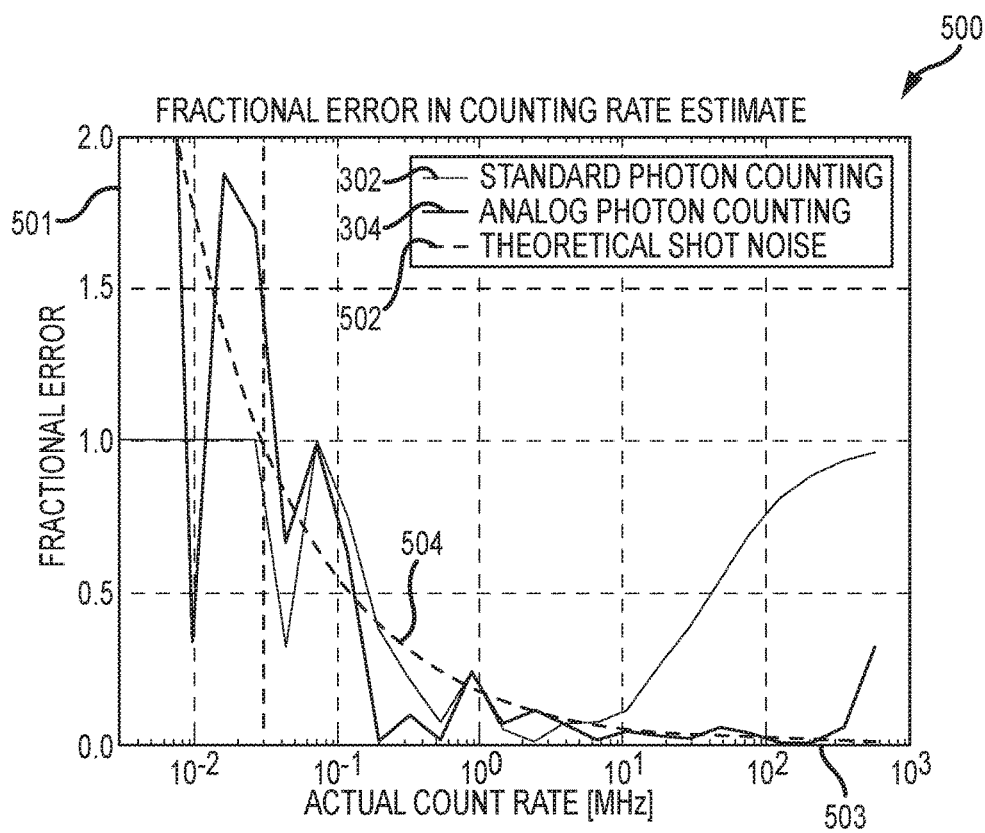
FIG. 7 illustrates an error in photon arrival rate as a function of count rate according to an embodiment.

FIG. 7 is a graph 500 that illustrates error (Y-axis 501) in the photon arrival rate resulting from standard photon counting 302 and analog photon counting 304 techniques as a function of actual photon arrival rate (X-axis 503). This measurement is computed directly from measured signals, so both signal statistics and detection nonlinearity are included. The theoretical shot noise standard deviation 502 is illustrated by the dashed line 504. There is only a limited region where the signal statistics and nonlinearity in standard photon counting 302 are relatively small. By comparison, however, the analog photon counting technique 304 has a significantly larger area exhibiting low uncertainty. The lower end of the error shown reduces proportionally to the square root of integration time. However, at some point, atmospheric variability dominates the signal uncertainty, which may be particularly problematic for nonlinear retrievals of optical properties with lidar signals (e.g. extinction). The level of accuracy available at high count rates for the analog photon counting 304 embodiments should be noted.

Analog photon counting offers a substantially increased dynamic range for atmospheric lidar, with a greatly increased signal linearity at high count rates, while exhibiting no appreciable signal degradation. Conversely, standard photon counting techniques perform well only with regard to signal degradation. Unlike the split, digitized, and photon counting modules know from the art, the analog photon counting embodiments require no additional processing to merge multiple profiles, as the analog photon counting system 10 provides a single signal. The embodiments provided are a useful component for any lidar measurement requiring high accuracy on short time scales.

Figure 8:
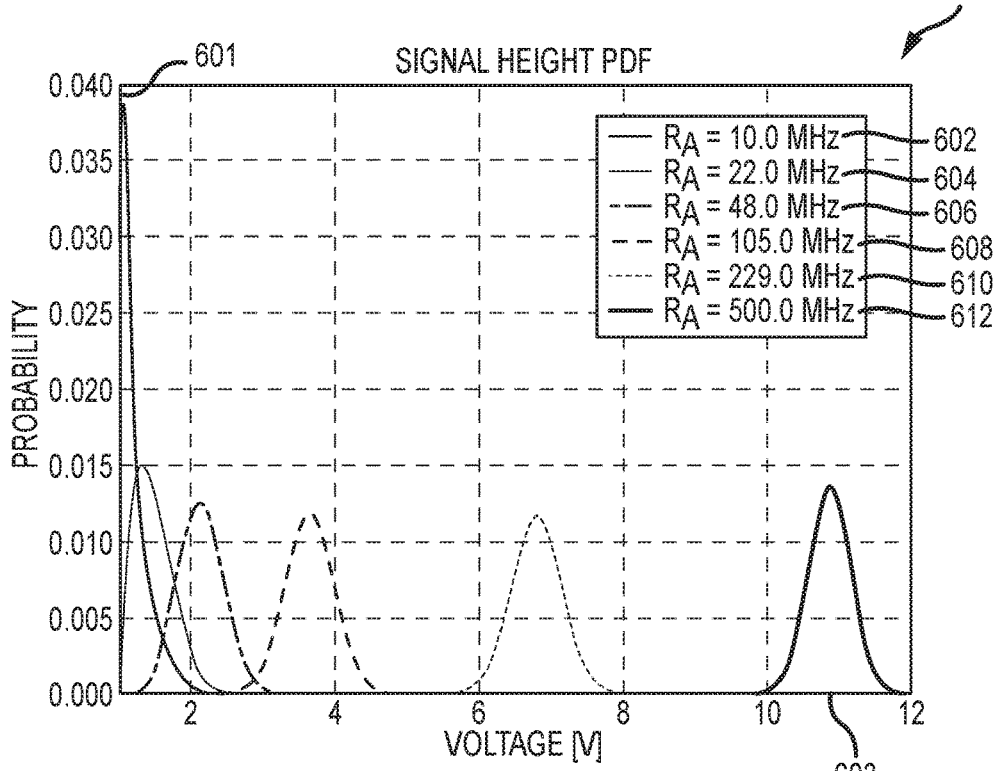
FIG. 8 illustrates probability distribution functions of peak input voltage to an ADC as a function of photon arrival rate, according to an embodiment.

The nonlinear response of the system 10 is governed by the limits of the ADC 16 input voltage. FIG. 8 is a graph 600 that illustrates the tradeoffs between low-pass filter bandwidth, maximum ADC voltage, and photon arrival rate. In particular, a probability distribution function of the peak ADC input voltage as a function of photon arrival rate is depicted, with probability being represented by the Y-axis 601, and voltage being represented on the X-axis 603. Peak voltage PDFs for various photon arrival rates are shown by the traces 602, 604, 606, 608, 610, 612, which correspond to mean photon arrival rates ($R_A$) of 10.0, 22.0, 48.0, 105.0, 229.0, and 500.0 MHz, respectively. In this illustration, the input pulse is assumed to be exponential with a time constant of 58 ns, but this value is provided merely as an example. Additionally, each pulse is assumed to have a height of 1.0 V. Note that the X-axis 603 starts at 1.0 V, since the peak pulse height begins with at least one pulse being present.

Figure 9:
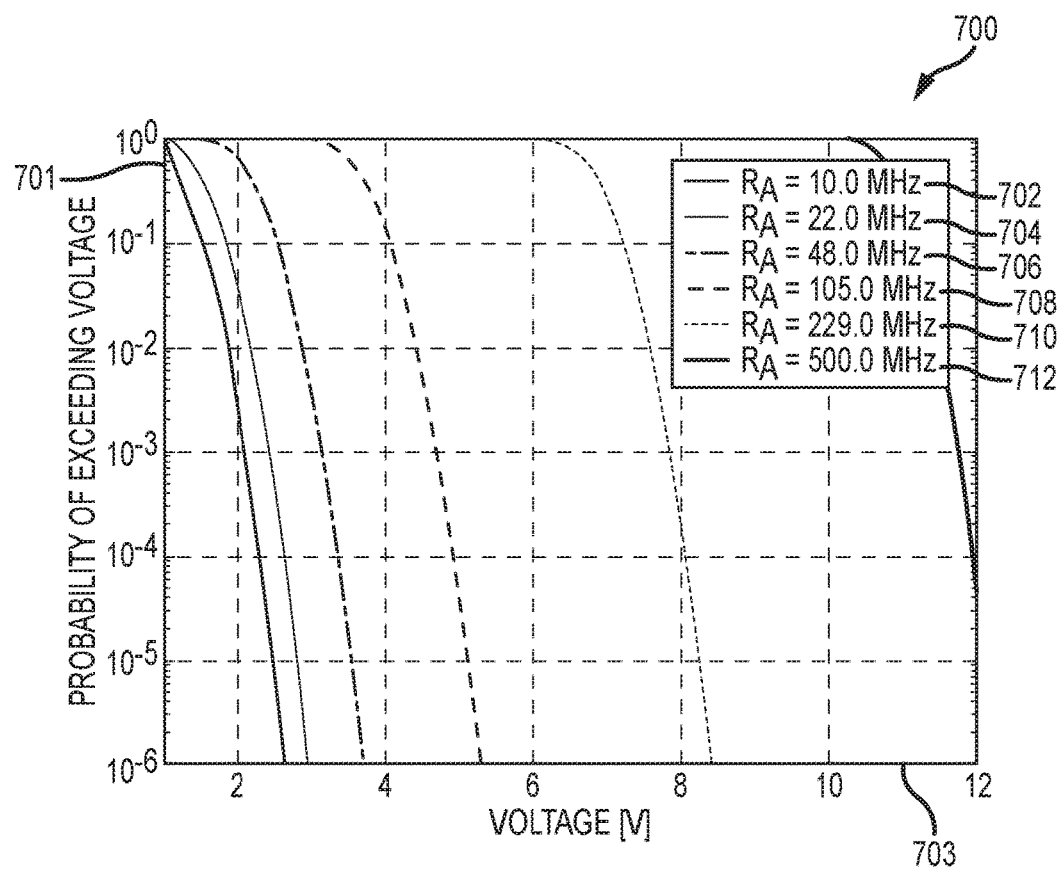
FIG. 9 illustrates a graph of the voltage PDFs of FIG. 8 as a probability that a particular voltage will be exceeded.

The results of the voltage PDFs are also plotted in FIG. 9 as a probability that a particular voltage will be exceeded, with the Y-axis 701 representing the probability of exceeding a voltage, and voltage being represented by the X-axis 703. Similarly, traces 702, 704, 706, 708, 710, 712, correspond to mean photon arrival rates ($R_A$) of 10.0, 22.0, 48.0, 105.0, 229.0, and 500.0 MHz. As an example, without limitation, at a 10 MHz photon arrival rate, an ADC limit of 2 V has a 1:1000 chance of saturating (curve 702 crosses 2 V at a probability of $10^{-3}$, for example). This graph 700 serves as an illustration for guidance in determining the acceptable nonlinear response for designed photon arrival rates for a particular implementation of a system 10 for analog photon counting according to an embodiment.

The ability of the embodiments described may accept large input signals without degradation of low signal detection, which is useful for any lidar measurement requiring high accuracy at small temporal scales. It is of particular advantage for retrieving atmospheric properties where the inversion is nonlinear, and therefore the retrieved property cannot be assumed to be averaged over the measurement integration time (e.g. extinction measurements). Note that in particular, cloud measurement would significantly benefit from this, because cloud signals are both high in backscatter intensity and tend to evolve very rapidly. Embodiments could therefore enable water vapor retrievals at cloud boundaries with water vapor DIAL lidar systems. Although, the embodiments are described in terms of atmospheric lidar application, the embodiments presented are not restricted to atmospheric applications, and any photon counting application is contemplated.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention should be determined from the following claims.

What is claimed is:
1. A photon counting system (10) comprising:
an analog domain (12);
a digital domain (14) in communication with the analog domain (12);
a detector (20) configured to detect photons;
an analog digital converter (16) in the digital domain (14);
an amplifier circuit in the analog domain (12) configured to receive the detector's (20) output, wherein the amplifier circuit's (23) output is in communication with the analog digital converter (16);
an accumulator (24) in communication with the analog digital converter (16), wherein the accumulator (24) is configured to integrate a signal from the analog digital converter (16) over a predetermined number of signals and differentiate the integrated signal, wherein a difference between two sample points corresponds to an amount of signal in an associated time bin.

2. The photon counting system (10) of claim 1, wherein the detector (20) comprises an analog detector.

3. The photon counting system (10) of claim 1, wherein the detector (20) comprises at least one of a photo multiplier tube and a hybrid photo-diode.

4. The photon counting system (10) of claim 3, wherein the low-pass filter (18) is configured to provide an integrated pulse profile to the analog digital converter (16).

5. The photon counting system (10) of claim 1, wherein the amplifier circuit comprises a pre-amplifier (22) and a low-pass filter (18).

6. The photon counting system (10) of claim 1, wherein an accumulator value is stored in a memory (26).

7. The photon counting system (10) of claim 6, wherein the accumulator (24) is reset to zero after the accumulator value is stored in the memory (26).

8. The photon counting system (10) of claim 6, wherein the accumulator (24) is configured to integrate the signal from the analog digital converter (16) over the predetermined number of signals before the accumulator value is reset to zero.

9. The photon counting system (10) of claim 1, wherein the predetermined number of signals corresponds to a range bin.

10. The photon counting system (10) of claim 1, wherein a filter (28) is provided between the analog digital converter (16) and the accumulator (24).

11. A method for counting photons comprising:
providing a system having an analog domain, a digital domain in communication with the analog domain, and a detector configured to detect photons;
detecting photons with the detector;
integrating a signal of the detector in the analog domain;
digitizing the integrated signal with an analog digital converter in the digital domain;
integrating a signal from the analog digital converter over a predetermined number of signals with and accumulator in communication with the analog digital converter;
differentiating a digital signal of the analog digital converter; and
wherein a difference between two sample points corresponds to an amount of signal in an associated time bin.

12. The method of claim 11, wherein the signal is sampled at a predetermined resolution.

13. The method of claim 11, wherein the signal is a current.

14. The method of claim 11, wherein the detector comprises an analog detector.

15. The method of claim 11, wherein the detector comprises at least one of a photo multiplier tube and a hybrid photo-diode.

16. The method of claim 11, wherein the detector signal comprises integrated pulses corresponding to pulse energy.

17. The method of claim 11, wherein:
detecting photons with the detector comprises capturing a plurality of photons with the detector; and
integrating a signal of the detector in the analog domain comprises integrating a combined energy of the plurality of photons.

18. The method of claim 17, comprising detecting additional photons with the detector before the signal falls below a predetermined threshold.

* * * * *